United States Patent [19]
Umeda et al.

[11] Patent Number: 5,557,348
[45] Date of Patent: Sep. 17, 1996

[54] PROGRESSIVE POWER LENS

[75] Inventors: Toshiaki Umeda, Tokyo; Fumio Takahashi, Ibaraki-ken, both of Japan

[73] Assignee: Nikon Corporation, Tokyo, Japan

[21] Appl. No.: 266,545

[22] Filed: Jun. 28, 1994

[30] Foreign Application Priority Data

Jun. 29, 1993 [JP] Japan .................................... 5-184412

[51] Int. Cl.$^6$ ...................................................... G02C 7/06
[52] U.S. Cl. ............................................................ 351/169
[58] Field of Search ..................................... 351/169, 176

[56] References Cited

U.S. PATENT DOCUMENTS 5,000,559  3/1991  Takahashi et al. ...................... 351/169

FOREIGN PATENT DOCUMENTS 0295849  12/1988  European Pat. Off. .
1-221721   9/1989  Japan .

OTHER PUBLICATIONS

Guilino, G. H., "Design Philosophy for Progressive Addition Lenses", *Applied Optics*, vol. 32, No. 1, Jan. 1, 1993, pp. 111–117.

Sawusch, M. R. et al, "Optimal Astigmatism to Enhance Depth of Focus After Cataract Surgery", *Ophthalmology*, vol. 98, No. 7, Jul. 1991, pp. 1025–1029.

*Primary Examiner*—Georgia Y. Epps
*Assistant Examiner*—Jordan M. Schwartz
*Attorney, Agent, or Firm*—Shapiro and Shapiro

[57] ABSTRACT

A progressive power lens of the present invention comprises, along a principal meridional curve, a portion for distance vision having a refracting power corresponding to a distant view, a portion for near vision having a refracting power corresponding to a near view and an intermediate portion, located between the portion for distance vision and the portion for near vision, for continuously connecting the refracting powers of the portion for distance vision and the portion for near vision. When an average refracting power (diopter) of a lens refracting surface at a center for distance vision is $S_0$ and an additional power of said lens refracting surface is $A_D$, from a center for distance vision to lateral side areas of the center for distance vision in a worn state, when a mean power (diopter) of each point of the lens refracting surface is $S_E$ and the difference between the mean power $S_E$ of each point of the lens refracting surface and the mean power $S_0$ of the center for distance vision is $\Delta S_E$ (i.e., $\Delta S_E = S_E - S_0$), the following condition holds:

$$-0.50 \leq \Delta S_E \leq A_D/3. + EA$$

7 Claims, 3 Drawing Sheets

PROGRESSIVE POWER LENS

BACKGROUND OF THE INVENTION

1. Field of the Invention

The present invention relates to a progressive power lens used to assist an accommodation power of an eye.

2. Related Background Art

In general, when a person reaches his/her late forties, an accommodation power of his/her eyes becomes weak and he/she finds it difficult to see a near point clearly. Namely, his/her eyes become presbyopic. As spectacles for assisting an accommodation power of presbyopic eyes, progressive power spectacle lenses (hereinafter referred to as the "progressive power lenses") have been used widely. Such a progressive power lens has a distance vision correcting region (referred to as a "portion for distance vision" hereinafter), a near vision correcting region (referred to as a "portion for near vision" hereinafter) and a progressive region (referred to as an "intermediate portion" hereinafter) located between the above two portions in which a refracting power is continuously changed. When worn by a user, the portion for distance vision becomes an upper portion while the portion for near vision becomes a lower portion. In the present invention, it is to be noted that "upper", "lower", "horizontal" and "vertical" are used to refer to positions of the progressive power lens in the state that it is actually worn by a user. For example, the lower portion of the portion for distance vision is a position within the portion for distance vision close to the intermediate portion.

FIG. 1 shows divisions of regions of a progressive power lens formed symmetrically. The progressive power lens has a portion F for distance vision, a portion N for near vision and an intermediate portion P located between those two portions F and N in which a refracting power is continuously changed. As for the shape of a lens surface, the intersecting curve MM' of the object-side lens surface and a cross section along a meridian line passing through approximately the center of the lens surface and extending vertically from top to bottom is used as a reference line for expressing specifications such as the additional power of the lens, and is also used as an important reference line in the lens design. In the thus designed progressive power lens, the center OF of the portion F for distance vision, an eye point E for distance vision and the center (eye point) ON of the portion N for near vision are located on the center line MM'.

Further, as shown in FIG. 2, in consideration of the fact that the portion N for near vision comes close to a nasal side when worn by the user, other progressive power lenses have been proposed in which a portion N for near vision is arranged asymmetrically (hereinafter referred to as a "asymmetrical type progressive power lens").

Also, in such an asymmetrical type progressive power lens, a center line MM' consisting of the intersecting curve of an object-side lens surface and a cross section passing through the center OF of a portion F for distance vision, a geometric center OG of the lens surface and the center ON of a portion N for near vision is used as a reference line. In the present invention, these reference lines will be referred to as "the principal meridional curve" hereinafter.

The respective centers of the portion F for distance vision and the portion N for near vision are reference positions for measuring lens powers. A reference point for measuring the lens power of portion F for distance vision is called the center OF for distance vision while a reference point for measuring the lens power of portion N for near vision is called the center ON for near vision. In general, the center ON for near vision coincides with the eye point for near vision.

In progressive power lenses, additional refracting powers are imparted continuously on the principal meridional curve MM' from the center OF for distance vision toward the center ON for near vision. The value obtained by subtracting the power imparted to the center OF for distance vision from the maximum power imparted to the center ON for near vision is called the additional power.

Progressive power lenses in which clear vision areas of the portion F for distance vision, the intermediate portion P and the portion N for near vision are wide and fluctuation and distortion of an image are small are ideal progressive power lenses.

However, the requirements of wider clear vision areas are contradictory to the requirements of reduction of swim and distortion of an image and both sets of requirements cannot be satisfied completely, as will be discussed in detail later. In order to obtain an ideal progressive power lens that is easy to use, as well as comfortable, it is necessary to select parameters regarding lens characteristics and therefore a lens design idea is concerned. Presently, progressive power lenses with various characteristics are manufactured.

As parameters for designing, basically, there are maximum and minimum principal curvatures of respective points on the lens refracting surface, the distribution thereof, the gradients of the normal lines at the respective points on the lens refracting surface, and the directions thereof.

As the result of arranging these parameters on the lens surface, lens characteristics such as widths of the clear vision areas of the portion for distance vision, the intermediate portion and the portion for near vision, the length of progressive power range (the intermediate portion) along the principal meridional curve, the convergence of the portion for near vision, the distribution of mean powers, the gradient thereof, the distribution of the astigmatic differences, the gradient of the powers thereof, the direction of the axis of astigmatism, the distribution of prism power, the gradient of the prism degrees and the basal direction thereof, and distortion are imparted.

Further, characteristics of the progressive power lens as a spectacle lens is determined by the outline of the lens, the lens aperture in terms of forming the lens thinner and lighter, specifications of the material (refractive index, Abbe number, specific gravity, etc.), the presence or absence of the prismatic thinning, the amount thereof, and the method of treating the lens surface.

In the above factors, the length of the intermediate portion, and the widths of the clear vision areas of the portion for distance vision, the intermediate portion and the portion for near vision are the factors greatly affecting the determination of the characteristics of the progressive power lens. It can be said that the characteristics of the progressive power lens are determined basically by these two factors.

For example, when a portion for distance vision and a portion for near vision are formed so as to have wide clear vision areas and are coupled by a progressive power range (intermediate portion), distortion of the curved surface is confined in a narrow area on the lens surface with a high density due to the provision of the intermediate portion. As a result, although the clear vision areas of the respective portions can be widened, lens aberrations, in particular, the astigmatic difference is concentrated on side areas of the intermediate portion. Due to the concentrated aberrations, blurring and distortion of an image occur in the side areas of the intermediate portion. Therefore, when a user wears spectacles formed of these progressive power lenses and shifts his eyes laterally, he perceives the distortion of an image as swim of the image and has an unpleasant feeling.

In this progressive power lens, although the clear vision areas of the portion for distance vision, the intermediate portion and the portion for near vision are enlarged, its evaluation is low and it cannot be said that the lens is easy to use and appropriate for practical use in that blurring, swim and distortion occur largely in the side areas of the intermediate portion where aberrations are liable to be concentrated.

Early progressive power lenses were of an aberration concentrated type in which aberrations were concentrated on side areas of an intermediate portion.

Also, when the length of an intermediate portion is shortened, the gradient of the additional power becomes steep. Therefore, aberrations are concentrated on the side areas of the intermediate portion.

According to Minkwitz's low described in Optica Acta (Volume 10, No. 3, July 1963), when the umbilical point form (the spherical shape becomes such that two principal curvatures respectively in the direction along the principal meridional curve and the direction perpendicular thereto are equal) is taken, the astigmatic difference on the lens surface is increased at a rate of double the surface refracting power on the umbilical point like principal meridional curve in the direction perpendicular to the principal meridional curve, so that a clear vision area cannot be enlarged.

In general, as the length of an intermediate portion is made large, swim, distortion and blurring of an image on side areas of a lens are lessened. However, due to the limitation in the angle of the rotation of the eye, the visual sight cannot be shifted with ease between the portion for distance vision and the portion for near vision. As a result, the user tends to use the portions for near vision for a long time. Therefore, the progressive power lens with the elongated intermediate portion is not suitable for practical use too.

However, if the visual range is limited such as from the portion for distance vision to the intermediate portion or from the intermediate portion to the portion for near vision, or the purpose of use is limited, the progressive power lens with the elongated intermediate portion can be used sufficiently.

The prime object in designing a progressive power lens is shifted from the conventional aberration concentrated type to an aberration distributed type in which aberrations are distributed to respective portions. Namely, it is required to form a progressive power lens to be the aberration distributed type to reduce swim and distortion of an image, to secure clear vision areas of a portion for distance vision, an intermediate portion and a portion for near vision widely. Also, in the lens designing, it is required to reduce swim and distortion of an image and to optimally secure clear vision areas of the respective portions by weighting parameters and carrying out the selection of the parameters, and arranging and unifying the selected parameters on the lens surface.

For optimizing the arrangement of refracting powers on a lens surface, a progressive power lens has been proposed in Japanese Patent Laid-Open Application No. 1-221721. In this progressive power lens, regarding the mean surface refracting power Q and the Gauss curvature G, a parameter consisting of its difference $\Delta q$ (i.e., $\Delta q = Q - G$) is set in respective points forming side areas of the lens refracting surface in which the astigmatic difference is above 0.5 diopters. The parameter $\Delta q$ represents the distribution of the astigmatic differences of the lens refracting surface, i.e., the amounts of the astigmatic differences and the gradient of the powers of the astigmatic differences. The arrangement of refracting powers on the side areas of the lens is optimized such that the value of the parameter $\Delta q$ is within a range defined by a function of the reference average refracting power $P_B$ on the portion for distance vision (surface refracting power on the center for distance vision).

The invention disclosed in the above publication defines the condition of a curved surface constituting a lens refracting surface capable of reducing aberrations to be concentrated on side areas of a lens, in particular, side areas of an intermediate portion thereby to reduce swim and distortion of an image and the additional power $A_D$.

Thus swim and distortion among visual characteristics can be reduced in the prior art to some extent. However, improvement of blurring (imaging defect) is performed to some extent, but is not yet sufficient.

In the above conventional progressive power lenses, visual performance is achieved to some extent but not sufficiently for practical use.

SUMMARY OF THE INVENTION

It is an object of the present invention to provide a high-performance progressive power lens in which blurring of an image in side areas of a portion for distant vision is improved and swim and distortion is small.

In order to achieve the above object, in a progressive power lens of the present invention comprising, along a principal meridional curve, a portion F for distance vision having a refracting power corresponding to a distant view, a portion N for near vision having a refracting power corresponding to a near view and an intermediate portion P, located between the portion F for distance vision and the portion N for near vision, for continuously connecting the refracting powers of the portion F for distance vision and the portion N for near vision, wherein when the mean refracting power (diopter) of a lens refracting surface at a center for distance vision is $S_0$ and an additional power of the lens refracting surface is $A_D$, the from the center OF for distance vision to lateral side areas thereof in the worn state, when the mean power (diopter) of each point of the lens refracting surface is $S_E$ and the difference between the mean power $S_E$ of each point of the lens refracting surface and the mean power $S_0$ of the center for distance vision is $\Delta S_E$ (i.e., $\Delta S_E = S_E - S_0$), the following condition holds:

$$-0.50 \leq \Delta S_E \leq A_D/3.$$

In a preferred embodiment of the present invention, when the mean power (diopter) of the lens refracting surface at a center for distance vision is $S_0$ and the additional power of the lens refracting surface is $A_D$, then from an eye point E for distance vision to lateral side areas thereof in the worn state, when the mean power (diopter) of each point of the lens refracting surface is $S_E$ and the difference between the mean power $S_E$ of each point of the lens refracting surface and the mean power $S_0$ of the center for distance vision is $\Delta S_E$ (i.e., $\Delta S_E = S_E - S_0$), the following condition holds:

$$-0.50 \leq \Delta S_E \leq A_D/3.$$

Also, in another progressive power lens of the present invention comprising, along a principal meridional curve, a portion F for distance vision having a refracting power corresponding to a distant view, a portion N for near vision having a refracting power corresponding to a near view and an intermediate portion P, located between the portion F for distance vision and the portion N for near vision, for continuously connecting the refracting powers of the portion F for distance vision and the portion N for near vision, wherein when an additional power (diopter) of a lens refracting surface is $A_D$, then in a lateral side area of a lower portion of the portion F for distance vision either on a nasal side or on a temporal side within $50/A_D$ mm from the principal meridional curve in the worn state, when a mean power (diopter) of each point of the lens refracting surface is $S_E$, the difference between the mean power $S_E$ of each point of the lens refracting surface and a mean power $S_0$ (diopter) of the center for distance vision is $\Delta S_E$, (i.e., $\Delta S_E = S_E - S_0$) and a power (diopter) of the astigmatic difference of the lens refracting surface is C, the following condition is satisfied:

$$2 \times \Delta S_E - 0.50 \leq C \leq 2 \times \Delta S_E + 0.75.$$

It is further preferable that this condition be satisfied in both lateral side areas of the lower portion of the portion F for distance vision on the nasal and temporal sides in the worn state.

In a preferred embodiment of the present invention, when the additional power (diopter) of the lens refracting surface is $A_D$, then in a lateral side area of the intermediate portion either on the nasal side or on the temporal side within $40/A_D$ mm from the principal meridional curve in the worn state, when a mean power (diopter) of each point of a lens refracting surface is $S_E$, the difference between the mean power $S_E$ of each point of the lens refracting surface and the mean power $S_0$ (diopter) of the center for distance vision is $\Delta S_E$ (i.e., $\Delta S_E = S_E - S_0$), and a power (diopter) of an astigmatic difference of the lens refracting surface is C, the following condition is satisfied:

$$2 \times \Delta S_E - 0.50 \leq C \leq 2 \times \Delta S_E + 0.75.$$

It is further preferable that this condition be satisfied in both lateral side areas of the intermediate portion on the nasal and temporal sides in the worn state.

In another progressive power lens of the present invention comprising, along a principal meridional curve, a portion F for distance vision having a refracting power corresponding to a distant view, a portion N for near vision having a refracting power corresponding to a near view and an intermediate portion P, located between the portion F for distance vision and the portion N for near vision, for continuously connecting the refracting powers of the portion F for distance vision and the portion N for near vision, wherein when the mean refracting power (diopter) of a lens refracting surface at a center for distance vision is $S_0$ and an additional power of the lens refracting surface is $A_D$, then from the center OF for distance vision to lateral side areas thereof in the worn state, when the mean power (diopter) of each point of the lens refracting surface is $S_E$ and the difference between the mean power $S_E$ of each point of the lens refracting surface and the mean power $S_0$ of the center for distance vision is $\Delta S_E$ (i.e., $\Delta S_E = S_E - S_0$), the following condition holds:

$$-0.50 \leq \Delta S_E \leq A_D/3,$$

and when the additional power (diopter) of the lens refracting surface is $A_D$, then in a lateral side area of a lower portion of the portion F for distance vision either on a nasal side or on a temporal side within $50/A_D$ mm from the principal meridional curve in the worn state, when the mean power (diopter) of each point of a lens refracting surface is $S_E$, the difference between the mean power $S_E$ of each point of the lens refracting surface and the mean power $S_0$ (diopter) of the center for distance vision is $\Delta S_E$, (i.e., $\Delta S_E = S_E - S_0$) and the power (diopter) of an astigmatic difference of the lens refracting surface is C, the following condition is satisfied:

$$2 \times \Delta S_E - 0.50 \leq C \leq \Delta S_E + 0.75.$$

According to a thesis "Optimal Astigmatism to Enhance Depth of Focus after Cataract Surgery" by Sawusch and Guyton carried in Ophthalmology (1991, 98–7: 1025–1029), an optimum relationship of the spherical refracting power and the power of the astigmatic difference capable of enhancing the depth of focus maximally is proposed by carrying out the minute calculation regarding the refracting power and the depth of focus in consideration of the astigmatism of the myopic eye. Specifically, in this method, the object points spaced by 0.25 m in the visual range of 0.5 m to 6 m in front of the myopic eye are projected to the retina of the ocular fundus and the areas of the images of the object points on the retina are added in geometrical optics. The refracting power for the eye when the total sum is minimized is obtained. As a result, it is said that when the mean refracting power (diopter) of the arithmetical mean of the refracting powers of both principal meridians is s and the power (diopter) of the astigmatic difference is c, the total sum of the areas of the images becomes minimum when the following expressions (1) and (2) hold:

$$c = -2 \times s - 0.50 \quad s \leq -0.25. \tag{1}$$

$$c = 2 \times s - 0.50 \quad s > -0.25. \tag{2}$$

As is apparent from the title, these works by Sawusch and Guyton concern a maximum target refracting power of an eye for obtaining optimum vision when an intraocular lens is implanted. Since the refracting power of the implanted eye is handled using the geometrical optics in these works, the principle of the above reference can be adequately applied to the presbyopic eye.

Conventionally, there is no case that a progressive power lens to be used to assist the presbyopic eye with weak accommodation power is designed from the viewpoint of the depth of focus. If it is possible to increase the depth of focus in the composite optical system of the lens and the eyeball system by properly arranging average refracting powers and powers of astigmatic differences on the lens refracting surface, it is very effective to assist the accommodation power of the presbyopic eye.

In general, the change of the additional power and the characteristics of the progressive power lens can be grasped approximately by obtaining average refracting powers and powers of astigmatic differences of the refracting surface from the main curvatures and contour line drawing of mean power thereof. More specifically, evaluation is carried out in two surfaces of the progressive power lens in consideration of the worn state. However, in order to grasp the tendency roughly and to simplify the description, the description will be limited to one surface of the progressive power lens.

The refracting power (diopter) of each point of the refracting surface is expressed, when the maximum and minimum principal curvatures of that point are $\psi_{max}$ and $\psi_{min}$, and the refractive index is n, as follows:

$$S_E = (\psi_{max} + \psi_{min}) \times (n-1)/2. \quad (3)$$

In general, the astigmatic difference is utilized as a parameter in order to evaluate the degrees of largeness of the clear vision area and blurring, swim and distortion of an image.

The power of the astigmatic difference C is a curvature of a free curved surface and the degree of astigmatism and is expressed as follows:

$$C = (\psi_{max} - \psi_{min}) \times (n-1). \quad (4)$$

When the power gradient is imparted to the intermediate portion P of the progressive power lens, the astigmatic differences occur naturally on the peripheral side areas (lateral side areas) thereof. As mentioned above, the amount of astigmatic difference is closely related to the length of the intermediate portion P. In general, the longer the length of the intermediate portion P becomes, the 1 smaller the maximum astigmatic difference and the density of the astigmatic aberration become, and vice versa.

Further, the astigmatic difference is varied depending on the power gradient thereof and the largeness of the effective field of view too. The presence of the astigmatic difference has been deemed to greatly affect the characteristics of the progressive power lens.

For the optical performance evaluation of spectacle lenses, the astigmatic difference of, for example the lens is utilized as a parameter from the viewpoint of the optical system of the eyeball and the visual characteristics of the retina. That is, the power of the astigmatic difference is a criterion to evaluate the performance of the lens. Therefore, it can be said that a lens with no or a small astigmatic difference is a high-performance lens.

Although the indices for representing the degree of the visual acuity are utilized to judge whether our vision is good or poor and there is blurring of images, those are conventionally handled as evaluation values due to the astigmatic difference. Similarly, in progressive power lenses, it goes without saying that the amount of the astigmatic difference is the most important parameter for evaluating the lens performance.

However, in the case of the presbyopic eye with the weak accommodation power, it is necessary to notice that the visual characteristics are changed by the spherical surface refracting power of lenses to be worn by the user. Namely, not only the astigmatic difference but also the spherical surface refracting power of the lens affects the presbyopic person's vision and perception of blurring of an image. 10 Therefore, in the progressive power lens in which the average power is changed over the entire lens surface although the gradient thereof is not so large as compared to that of the mean powers on the principal meridional curve, not only the astigmatic difference but also the mean powers affect the visual characteristics greatly.

It is well known that in order to reduce the power gradient of the progressively changed power of the intermediate portion P and to reduce swim and distortion of an image in the side areas of the lower portion of the portion F for distance vision, it is effective to make the power gradient small in the side areas of the portion F for distance vision as compared to the principal meridional curve as the center line. Therefore, a method can be considered in which the progressive power region is enlarged to the portion F for distance vision and the portion N for near vision to reduce the mean power gradient.

However, a wide region cannot be secured for the portion N for near vision. Therefore, even though the progressive power region is enlarged to an area of the portion N for near vision, the effect for reducing the power gradient cannot be expected.

Accordingly, it is effective to enlarge the progressive power region to the side areas of the portion F for distance vision and then the positive refracting power is added to a predetermined power for distance vision in the side areas of the portion for distance vision. This method is adopted to design present progressive power lenses.

As a result, in the side regions of the portion for distance vision, the distance vision is lowered. This is because when looking at a far point through the area (i.e., the side areas of the portion for distant vision) where the positive refracting power is added to the predetermined refracting power for distance vision, the far point comes closer to the user to cause the far point to be blurred, i.e., the state of myopia occurs.

In the presbyopic eye with the weak accommodation power, the visual range to be seen clearly is narrowed. Therefore, when the progressive power lens is used to assist the weak accommodation power, the user can see an object clearly only when, in accordance with the distance of the object, the eyeball is rotated to shift the visual line to an area of the lens where a required power can be obtained.

Without rotating the eyeball, in order to make the user feel that he has the accommodation power, it is necessary to enhance the depth of focus. It is well known that the luminous flux in the optical system is stopped down to increase the depth of focus. This is the basic principle in optics and it is well known that blurring of an image is corrected by changing the F-number of the lens of the camera.

For applying this principle to the optical system of the eyeball, the diameter of the iris of the eye needs to be stopped down. Therefore, it is necessary to keenly utilize the property of the iris and the pupil responsive to the brightness. The most effective and easy way is to brighten the environment. To pass in the bright environment is very advantageous to reduce consciousness of presbyopic and the state of presbyopic.

If the depth of focus can be enlarged even slightly in the progressive power lens, it is possible to realize a progressive power lens that is more easy to use.

From the above study, it is concluded that in order to enhance the depth of focus, it is effective to perform power arrangement of the lens refracting surface such that a predetermined relationship between the average refracting power and the power of the astigmatic difference holds. Approximately, the relationship between the surface mean refracting power and the astigmatic difference can be expressed the same as that discussed in the above reference.

First, in order to improve blurring of an image and to reduce fluctuation and distortion of the image in the side areas of the portion for distance vision when looking at a far point through the side areas of the portion for distance vision, when the mean power (diopter) of the lens refracting surface at the center for distance vision is $S_0$ and the additional power of the lens refracting surface is $A_D$, then from the center for distance vision to lateral side areas thereof in the worn state, when the mean power (diopter) of each point of the lens refracting surface is $S_E$ and the difference between the mean power $S_E$ of each point of the lens refracting surface and the mean power $S_0$ of the center for distance vision is $\Delta S_E$ (i.e., $\Delta S_E = S_E - S0$), the following condition holds:

$$-0.50 \leq \Delta S_E \leq A_D/3. \tag{5}$$

Further, in order to reduce blurring of an image in the side areas of the portion for distance vision, the condition (5) is preferably satisfied from the eye point for distance vision to the lateral side areas thereof in the worn state.

When the mean powers of the side areas of the portion for distance vision are made to be the negative powers, it is effective to reduce blurring of an image. However, when the (positive power) for the portion for near vision are added thereto, the gradient of the mean powers becomes steep in side areas from the lower portion of the portion F for distance vision to the intermediate portion P, and the astigmatic difference is enlarged, so this method cannot be adopted generally. However, needless to say, the lens with such power arrangement becomes practical if the purpose of use is limited.

In order to enhance the depth of focus with the spectacles worn, when the additional power (diopter) of the lens refracting surface is $A_D$, then in the lateral side area of the lower portion of the portion F for distance vision either on the nasal side or on the temporal side within $50/A_D$ mm from the principal meridional curve in the worn state, when the mean power (diopter) of each point of the lens refracting surface is $S_E$ and the difference between the mean power $S_E$ of each point of the lens refracting surface and the mean power $S_0$ of the center for distance vision is $\Delta S_E$, (i.e., $\Delta S_E = S_E - S_0$) and the power (diopter) of the astigmatic difference of the lens refracting surface is C, the following condition is satisfied:

$$2 \times \Delta S_E - 0.50 \leq C \leq 2 \times \Delta S_E + 0.75. \tag{6}$$

It is preferable to apply this relationship between the mean power and the astigmatic difference not only to the lateral side areas of the principal meridional curve in the lower portion of the portion F for distance vision but also the lateral side areas of the principal meridional curve in the intermediate portion P.

In the method for reducing blurring of an image by the above power arrangement when seeing a far point, first the power gradient in the vertical direction in the side areas of the portion for distance vision can be lessened, whereby swim and distortion of an image can be reduced. If the value of the astigmatic difference occurring due to this method were large, the lens performance would be deteriorated. However, the power of the astigmatic difference in the portion F for distance vision is limited by an amount of change of power $\Delta S_E$ in expression (6) within the predetermined range so as to be extremely small, so that blurring, swim and distortion of an image can be reduced in the wide range including the side areas of the portion F for distance vision.

Also, it was found that by applying the relationship between the average power and the power of the astigmatic difference defined by the expression (6) to the side areas from the lower portion of the portion F for distance vision to the intermediate portion P, improvement of vision and the increase of the depth of focus can be obtained in these areas having the comparatively large astigmatic difference, as compared to the conventional lenses.

When the expressions (1) and (2) in the above reference are compared to the expression (6) in this invention, the sign of the lower limit of the expression (6) is reversed. That matter can be understood from the fact that when the emmetropic eyes wear spectacle lenses, the signs of their refracting powers are reversed in the refraction correcting effect.

Thus, as the application of the above reference, by satisfying the relationship between the average power and the power of the astigmatic difference, the total sum of the blurrings of images of object points from far to near formed on the retina of the ocular fundus is minimized in that visual range, so that the same effect as enhancement of the depth of focus can be obtained.

It corresponds to the state that the posterior focal line among the two focal lines constituting the conjugate images of an object point in the vicinity of a far point projected to the retina by the optical system in the astigmatic state coincides with approximately the position of the retina and the anterior focal line among the two focal lines constituting the conjugate images of an object point in the vicinity of a near point coincides with approximately the position of the retina. When observed from the side of the retina, it is set such that the conjugate point of the refracting power of one principal meridian of the retina is positioned in the vicinity of the far point while the conjugate point of the refracting power of the other principal meridian of the retina is positioned in the vicinity of the near point, so that the total sum of the blurrings of the images in that range can be lessened.

When the visual range in front of the eye is set to be 0.5 m to $\infty$ in the above reference, and when the mean power (diopter) of the powers of both the principal meridians is S, the power ( diopter ) of the astigmatic difference is C, the blurring of an image is made minimum when the following expressions hold:

$$c = -2 \times s \quad s \leq -0.00 \tag{7}$$

$$c = 2 \times s \quad s > -0.00. \tag{8}$$

Therefore, in the present invention, the upper and lower limits of the expression (6) are determined in consideration of probability of changing the visual distance for seeing a distant point.

DETAILED DESCRIPTION OF THE PREFERRED EMBODIMENTS

An embodiment of the present invention will be described with reference to the accompanying drawings.

In a progressive power lens of this embodiment, the power for distance vision is 0.00 diopter, the additional power for near vision is 2.50 diopters and the effective aperture becomes 60ϕ when the lens is put into the frame of spectacles. Performance evaluation, were carried out for this progressive power lens.

Figure 1:
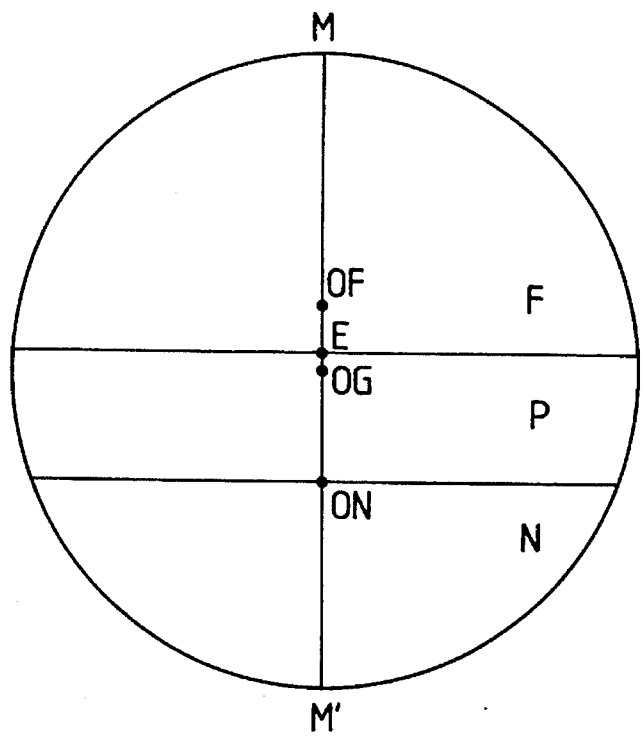
FIG. 1 is a plan view showing divisions of regions of a conventional symmetrical type progressive power lens.
Figure 2:
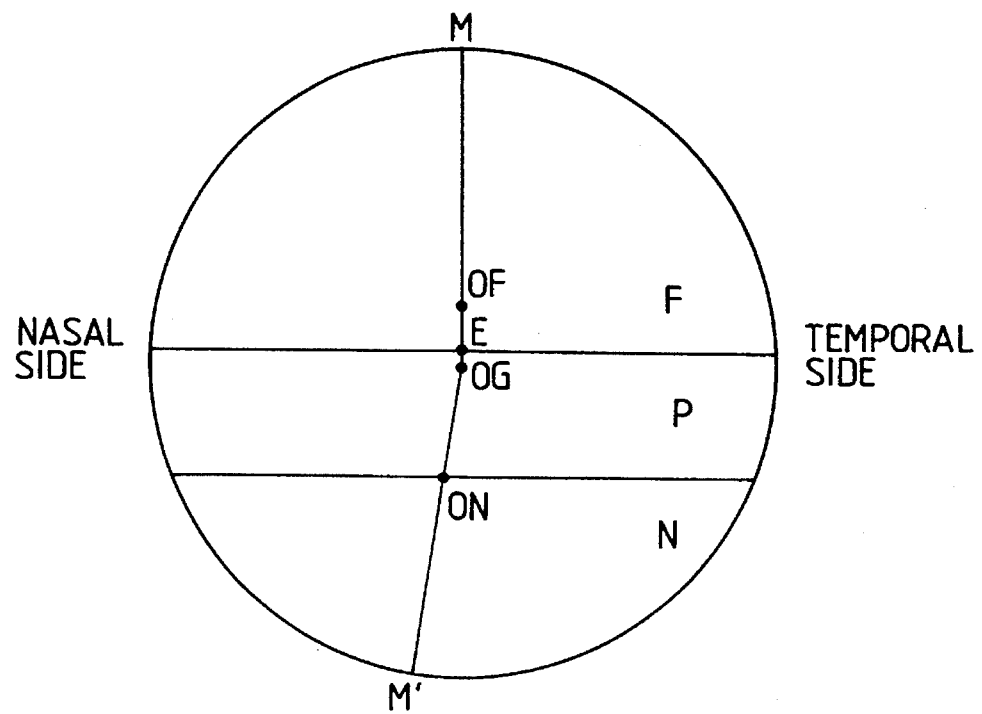
FIG. 2 is a plan view showing divisions of regions of an asymmetrical type progressive power lens of the present invention.
Figure 3:
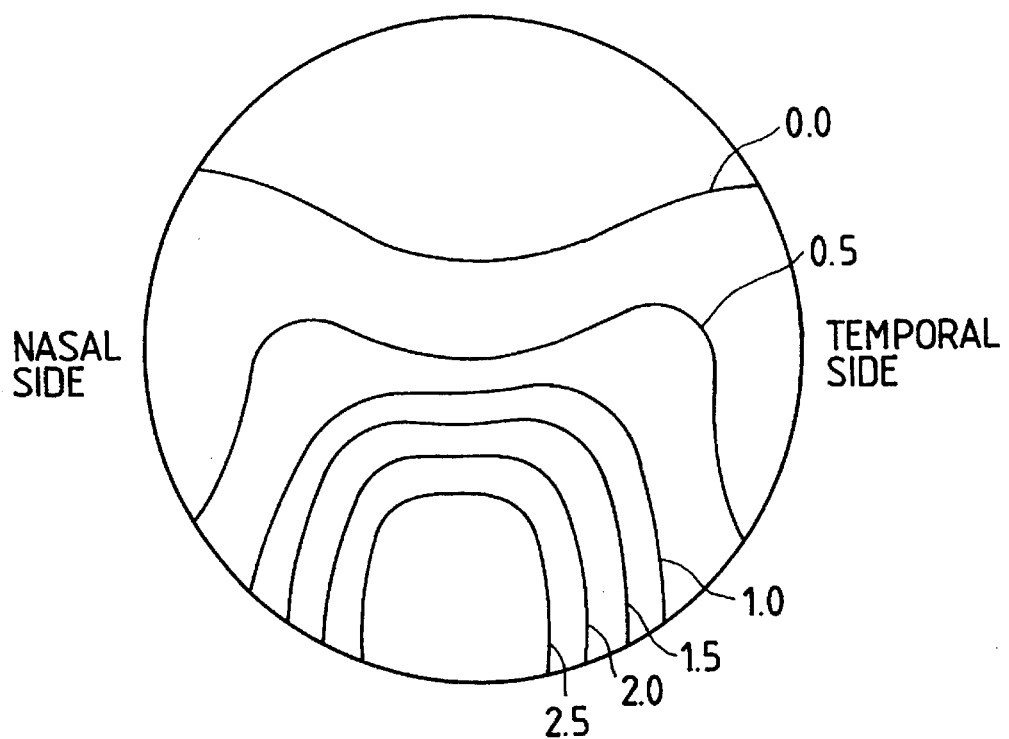
FIG. 3 is a diagram showing contour lines of mean power of a progressive power lens according to an embodiment of the present invention.

FIG. 3 is a diagram showing mean power curves of the progressive power lens of this embodiment obtained by connecting points with the same mean power. The power at the center OF for distance vision which is the reference point for measuring powers of the portion for distance vision is set to be the reference power (i.e., the reference value: 0.00 diopter) and the power of each point on the lens is expressed by the value of the added power to the reference value. The values shown in the drawing for to the mean power curves indicate the powers (diopter) of the curves and the mean power curves are plotted in increments of 0.50 diopters.

Figure 4:
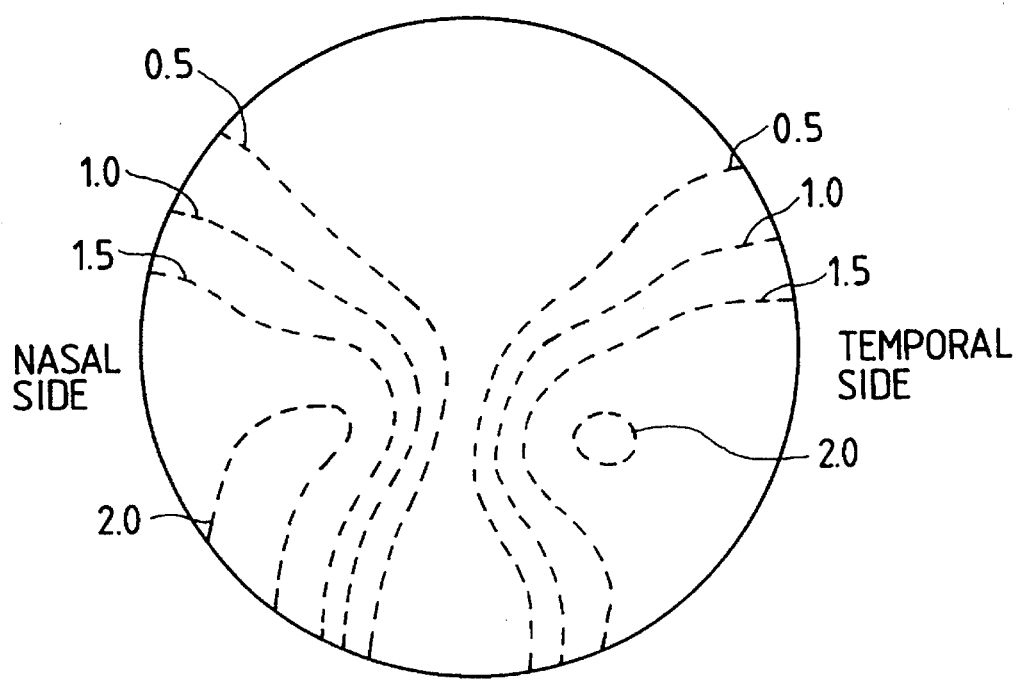
FIG. 4 is a diagram showing contour lines of isoastigmatic difference of the progressive power lens according to the embodiment of the present invention.

FIG. 4 is a diagram showing contour lines of isoastigmatic difference of the progressive power lens of this embodiment obtained by connecting points with the same astigmatic differences. The contour lines of isoastigmatic differences are plotted in increments of 0.50 diopters.

As is apparent from FIG. 4, the clear vision area (range with the astigmatic difference of 0.5 diopters or less) is made large on the temporal side (right side in the drawing) in the portion F for distance vision and the portion N for near vision. Also, as the gradient of the astigmatic differences is gentle on the temporal side in the portion N for near vision, the density of the astigmatic differences is sparse on the temporal side.

When the additional power is 2.5 diopters, the value of the maximum astigmatic difference is 2.5 diopters in the conventional progressive power lens but is reduced to 2.0 diopters in the progressive power lens of this embodiment.

Figure 5:
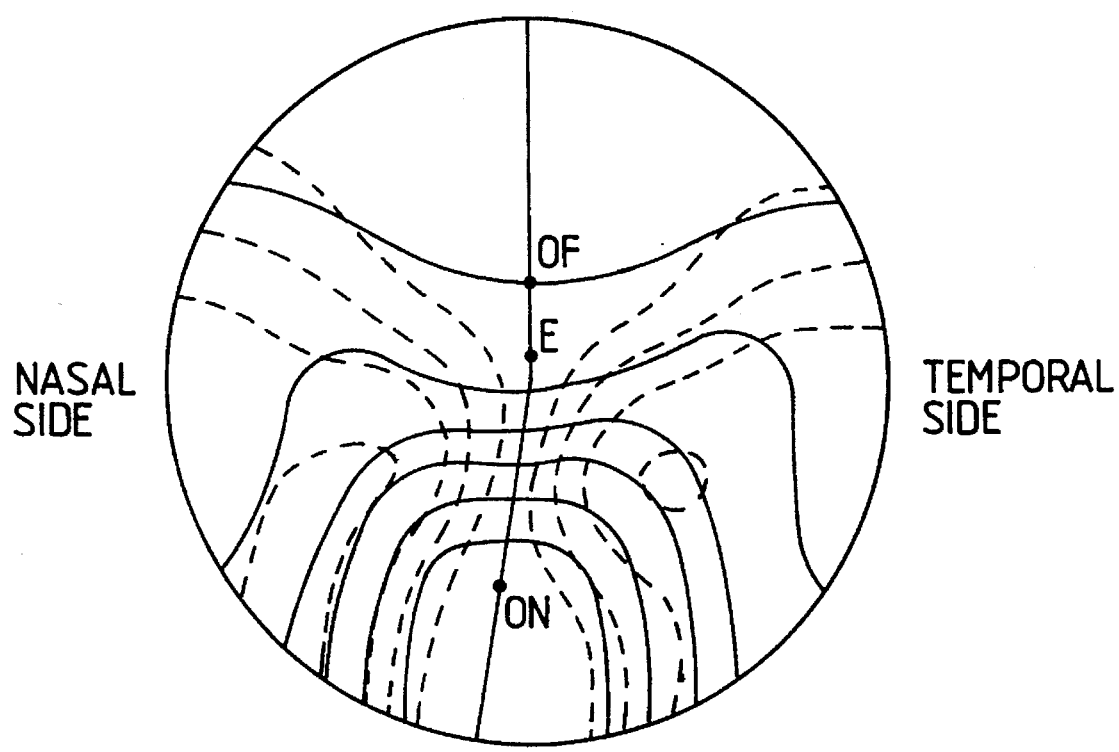
FIG. 5 is a diagram obtained by superimposing FIG. 3 on FIG. 4.

FIG. 5 is a diagram formed by superimposing the diagram of FIG. 3 showing the mean power curves (solid lines) and the diagram of FIG. 5 showing the contour lines of isoastigmatic differences (broken lines). From the mean power curves (solid lines) in the portion F for distance vision in FIG. 5, it is known that the mean power is approximately constant from the eye point E for distance vision to the lateral side areas thereof and the arrangement of the refracting powers on the lens refracting surface is performed so as to satisfy the expression (5).

In general, the actual lens aperture is larger than 60ϕ, so there would be peripheral areas where the expression (5) is not satisfied. However, as such peripheral areas are almost entirely cut off when setting the lens in the frame of spectacles, there is little influence by them.

In general, in the progressive power lens, it is reasonable to make the eye point for distance vision be the reference point. Also, the reference point can be shifted from the geometric center in the horizontal direction to form an eccentric lens having a large effective aperture when set in the frame. Apparently, the present invention is applicable to such an eccentric lens.

As described above, according to the present invention, within the area (lower portion of the portion for distance vision) having extremely small astigmatic difference, the mean powers are set to have a predetermined relationship. Therefore, in the large region, not only swim and distortion of an image but also the blurring of the image can be improved, contributing to provision of a highly practical progressive power lens.

Also, by applying the relationship of the refracting power and the astigmatic difference to the side areas from the lower portion of the portion for distance vision and the intermediate portion, it is possible to improve vision and to enlarge the depth of focus in these areas having comparatively large astigmatic difference as compared to the conventional progressive power lenses. Further, the effect of enlargement of the depth of focus can be expected more or less in the portion for distance vision. When the visual line is directed to these regions, the depth of focus is increased in the optical system of the eyeball with the progressive power lens of the present invention as compared to the conventional progressive power lenses. Further, swim and distortion of an image are reduced and the length of intermediate portion is short (16 mm to 14 mm). Thus, it is possible to realize a highly practical progressive power lens.

What is claimed is:

1. A progressive power lens comprising, along a principal meridional curve, a portion for distance vision having a refracting power corresponding to a distant view, a portion for near vision having a refracting power corresponding to a near view, and an intermediate portion, located between said portion for distance vision and said portion for near vision, for continuously connecting the refracting powers of said portion for distance vision and said portion for near vision, wherein, when a mean refracting power, in diopters, of a lens refracting surface at a center for distance vision is $S_0$, an additional power of said lens refracting surface is $A_D$, a mean power, in diopters, of each point of said lens refracting surface is $S_E$, and a difference between the mean power $S_E$ of each point of the lens refracting surface and said mean power $S_0$ of said center for distance vision is $\Delta S_E = S_E - S_0$, the lens satisfies the following condition from a center for distance vision to lateral side areas of said center for distance vision, as considered in a state in which said lens is worn:

$$-0.50 \leq \Delta S_E \leq A_D/3.$$

2. A progressive power lens according to claim 1, wherein said condition is satisfied from an eye point for distance vision to lateral side areas of said eye point for distance vision, as considered in a state in which said lens is worn.

3. A progressive power lens according to claim 1, wherein said condition is satisfied in a lower portion of said portion for distance vision and in a range from said principal meridional curve to lateral side areas of said principal meridional curve, as considered in a state in which said lens is worn.

4. A progressive power lens according to claim 2, wherein said condition is satisfied in a lower portion of said portion for distance vision and in a range from said principal meridional curve to lateral side areas of said principal meridional curve, as considered in a state in which said lens is worn.

5. A progressive power lens comprising, along a principal meridional curve, a portion for distance vision having a refracting power corresponding to a distant view, a portion for near vision having a refracting power corresponding to a near view, and an intermediate portion, located between said portion for distance vision and said portion for near vision, for continuously connecting the refracting powers of said portion for distance vision and said portion for near vision, wherein, when an additional power, in diopters, of a lens refracting surface is $A_D$, a mean power, in diopters, of each point of said lens refracting surface is $S_E$, a difference between said mean power $S_E$ of each point of the lens refracting surface and a mean power $S_0$ of a center for distance vision is $\Delta S_E = S_E - S_0$, and a power, in diopters, of an astigmatic difference of each point of said lens refracting surface is C, the following condition is satisfied in a lateral side area of a lower portion of said portion for distance vision either on a nasal side or on a temporal side within $50/A_D$ mm from the principal meridional curve, as considered in a state in which said lens is worn:

$$2 \times \Delta S_E - 0.50 \leq C \leq 2 \times \Delta S_E + 0.75.$$

6. A progressive power lens according to claim 5, wherein said condition is satisfied in a lateral side area of said intermediate portion either on the nasal side or on the temporal side within $40/A_D$ mm from said principal meridional curve, as considered in a state in which said lens is worn.

7. A progressive power lens comprising, along a principal meridional curve, a portion for distance vision having a refracting power corresponding to a distant view, a portion for near vision having a refracting power corresponding to a near view, and an intermediate portion, located between said portion for distance vision and said portion for near vision, for continuously connecting the refracting powers of said portion for distance vision and said portion for near vision, wherein, when a mean refracting power, in diopters, of a lens refracting surface at a center for distance vision is $S_0$, an additional power of said lens refracting surface is $A_D$, a mean power, in diopters, of each point of said lens refracting surface is $S_E$, and a difference between said mean power $S_E$ of each point of the lens refracting surface and said mean power $S_0$ of said center for distance vision is $\Delta S_E = S_E - S_0$, the following condition is satisfied from a center for distance vision to lateral side areas of said center for distance vision, as considered in a state in which said lens is worn:

$$-0.50 \leq \Delta S_E \leq A_D/3,$$

and, when a power, in diopters, of an astigmatic difference of each point of said lens refracting surface is C, the following condition is satisfied in a lateral side area of a lower portion of said portion for distance vision either on a nasal side or on a temporal side within $50/A_D$ mm from said principal meridional curve, as considered in a state in which said lens is worn:

$$2 \times \Delta S_E - 0.50 \leq C \leq 2 \times \Delta S_E + 0.75.$$

* * * * *